US012427616B2

(12) United States Patent
Curnett et al.

(10) Patent No.: US 12,427,616 B2
(45) Date of Patent: Sep. 30, 2025

(54) HANDHELD BLADE STEEL

(71) Applicant: Hantover, Inc., Overland Park, KS (US)

(72) Inventors: Ronald J. Curnett, Cross Timbers, MO (US); Craig E. Feeler, Independence, MO (US)

(73) Assignee: Hantover, Inc., Overland Park, KS (US)

( * ) Notice: Subject to any disclaimer, the term of this patent is extended or adjusted under 35 U.S.C. 154(b) by 702 days.

(21) Appl. No.: 17/717,998

(22) Filed: Apr. 11, 2022

(65) Prior Publication Data

US 2023/0321783 A1 Oct. 12, 2023

(51) Int. Cl.

| | |
|---|---|
| ***B24B 3/46*** | (2006.01) |
| ***B24B 3/00*** | (2006.01) |
| ***B24D 15/04*** | (2006.01) |
| ***B24D 15/08*** | (2006.01) |
| *B26B 25/00* | (2006.01) |

(52) U.S. Cl.

CPC .................. *B24B 3/46* (2013.01); *B24B 3/00* (2013.01); *B24D 15/04* (2013.01); *B24D 15/081* (2013.01); *B26B 25/002* (2013.01)

(58) Field of Classification Search

CPC .... B24D 15/08; B24D 15/081; B24D 15/082; B24D 15/06; B24D 15/04; B24D 15/02; B24D 15/061; B24D 15/063; B24D 15/065; B24D 15/084; B24B 3/46; B24B 3/48; B24B 3/50; B24B 3/52; B24B 3/54; B24B 3/55; B24B 3/605; B24B 3/40; B24B 3/44; B24B 19/16; B24B 19/002; B24B 19/001; B24B 27/0076; B24B 23/00; B24B 3/00; B24B 3/36–368; B24B 3/546; B24B 3/56; B26B 25/002; B23Q 11/00

USPC .................. 451/486, 45, 349; 76/86, 88, 82

See application file for complete search history.

(56) References Cited

U.S. PATENT DOCUMENTS

| | | | | |
|---|---|---|---|---|
| 4,934,110 | A * | 6/1990 | Juranitch | B24D 15/081 76/82 |
| 5,478,272 | A | 12/1995 | Cozzini et al. | |
| 6,679,767 | B2 | 1/2004 | Loehnert | |
| 6,769,326 | B2 | 8/2004 | Bodard | |
| 6,866,569 | B2 | 3/2005 | Cozzini | |
| 8,282,448 | B2 | 10/2012 | Loehnert | |
| 9,545,703 | B1 * | 1/2017 | Juranitch | B24D 15/081 |

(Continued)

FOREIGN PATENT DOCUMENTS

| | | |
|---|---|---|
| EP | 2704877 | 3/2015 |
| EP | 2937179 | 5/2017 |

OTHER PUBLICATIONS

European Search Report from European Application No. 23167101.7 (Dated Aug. 22, 2023).

*Primary Examiner* — David S Posigian
*Assistant Examiner* — Michael A Gump
(74) *Attorney, Agent, or Firm* — Hovey Williams LLP

(57) ABSTRACT

A tool for steeling a knife includes a frame and first and second steeling components. Each of the components is shiftably mounted relative to the frame for movement between a first position and a second position. The steeling components cooperatively define a knife interface configured to engage and thereby steel the knife. The steeling components are resiliently biased into the first position, with the knife interface moving as the steeling components shift between the first and second positions.

31 Claims, 13 Drawing Sheets

(56) References Cited

U.S. PATENT DOCUMENTS

| | | | |
|---|---|---|---|
| 2010/0112921 | A1 | 5/2010 | Loehnert |
| 2020/0368877 | A1 | 11/2020 | Sirotich |

* cited by examiner

HANDHELD BLADE STEEL

The present application is filed contemporaneously with U.S. patent application Ser. No. 29/834,3615, entitled HANDHELD BLADE STEEL, the entire disclosure of which is hereby incorporated by reference herein.

FIELD OF THE INVENTION

The present invention concerns systems and methods for steeling blades of tools, such as cutting tools, knives, etc. More particularly, the present invention is particularly suitable for steeling the blades of rotary knives.

BACKGROUND

The blades of sharp tools call for regular maintenance in order to preserve the ability to continue cutting.

Such maintenance consists of regular sharpening operations during which the cutting edge of the sharp tool is corrected using a suitable surface by removing at least some of the surface of the cutting edge of the sharp tool. However, the need to sharpen the cutting edge can be delayed by steeling the sharp tool, wherein a steeling component aligns the cutting edge instead of removal of the cutting edge surface as required with sharpening.

However, conventional steels are not properly adapted for use with rotary knifes. Accordingly, rotary knife blades often must be replaced instead of being maintained.

BRIEF SUMMARY

The following brief summary is provided to indicate the nature of the subject matter disclosed herein. While certain aspects of the present invention are described below, the summary is not intended to limit the scope of the present invention.

A first aspect of the invention includes a tool for steeling a knife. The tool includes a frame. The tool also includes a first steeling component and a second steeling component, each being shiftably mounted relative to the frame for movement between a first position and a second position. The steeling components cooperatively define a knife interface configured to engage and thereby steel the knife. The steeling components are resiliently biased into the first position, with the knife interface moving as the steeling components shift between the first and second positions. The tool also includes a stop stationary relative to the frame, wherein the stop engages the first steeling component when in the first position and engages the second steeling component when in the second position.

A second aspect of the invention includes a tool for steeling a knife. The tool includes a frame. The frame includes first and second support members. The support members define an elongated knife-receiving slot. A first steeling component and a second steeling component are supported on the first and second support members, respectively. The first and second steeling components are resiliently biased toward one another to define a knife interface configured to engage and thereby steel the knife. The knife interface moves inwardly along the length of the knife-receiving slot to a terminal interface position, as the knife engages the interface and is shifted inwardly through the knife-receiving slot. The knife-receiving slot has a maximum slot cross-sectional dimension defined between the support members. At least one of the support members present an outer member portion extending along the knife-receiving slot outwardly relative to the terminal interface position. The outer member portion has a maximum member cross-sectional dimension defined generally perpendicular to the length of the knife-receiving slot. The maximum member cross-sectional dimension is less than about two times the maximum slot cross-sectional dimension.

A third aspect of the invention includes a method for steeling a rotary knife having a circular blade, wherein the blade includes a cutting edge that defines a center opening. The method includes the steps of receiving a support member of a steeling tool within the center opening of the blade. The method also includes engaging the cutting edge on a blade interface cooperatively defined by a pair of steeling components of the tool, wherein one of the components is supported by the support member.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of apparatuses and methods disclosed therein. It should be understood that each Figure depicts an embodiment of a particular aspect of the disclosed apparatuses and methods, and that each of the Figures is intended to accord with a possible embodiment thereof. Further, wherever possible, the following description refers to the reference numerals included in the following Figures, in which features depicted in multiple Figures are designated with consistent reference numerals.

Figure 1:
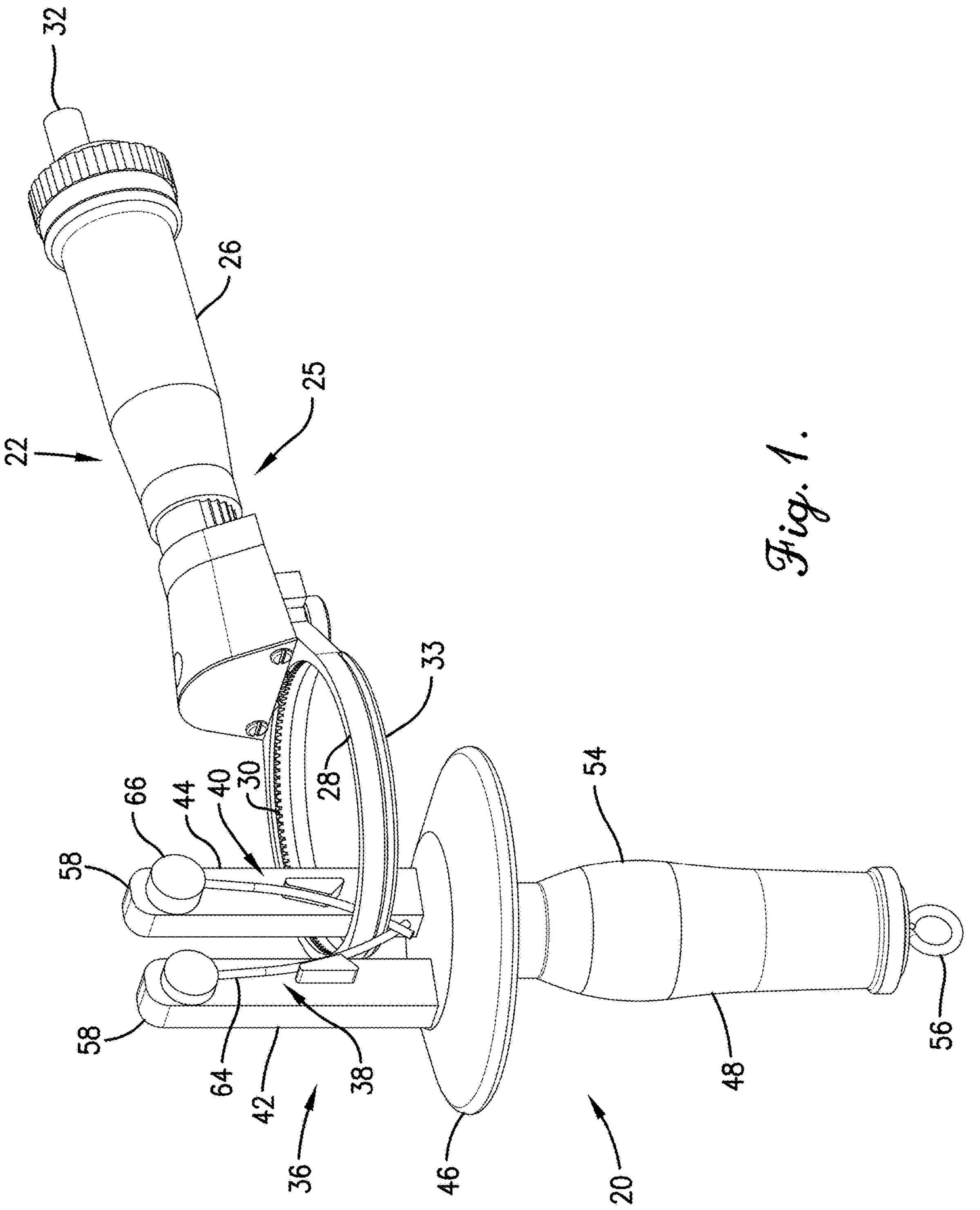
FIG. 1 is a perspective view of a steeling tool according to a preferred embodiment of the present invention while in use with a rotary knife.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. While the drawings do not necessarily provide exact dimensions or tolerances for the illustrated components or structures, the drawings are to scale with respect to the relationships between the components of the structures illustrated in the drawings.

DETAILED DESCRIPTION

Throughout the following description, like elements will be referred to using the same reference numbers whenever possible. Additionally, certain phrases may be used interchangeably. For example, a person having ordinary skill in the art will understand that the terms "steel," "tool," and "steeling tool" may be used interchangeably. Similarly, the terms "knife," "rotary knife," "blade," "rotary knife blade," "cutting edge of a rotary knife," and "cutting edge" may also (but necessarily) be used interchangeably in this description.

FIGS. 1-10 depict an exemplary steeling tool 20 according to a preferred embodiment of the present invention. The steeling tool 20 is preferably used to steel a rotary knife 22. The rotary knife is suitable for use in animal slaughterhouse operation for dressing an animal carcass. However, according to certain aspects of the present invention, the steeling tool 20 may be used to steel other powered tools, knives (such as straight blade knives), or other tools having blades and/or a cutting edge requiring routine steeling.

Figure 2:
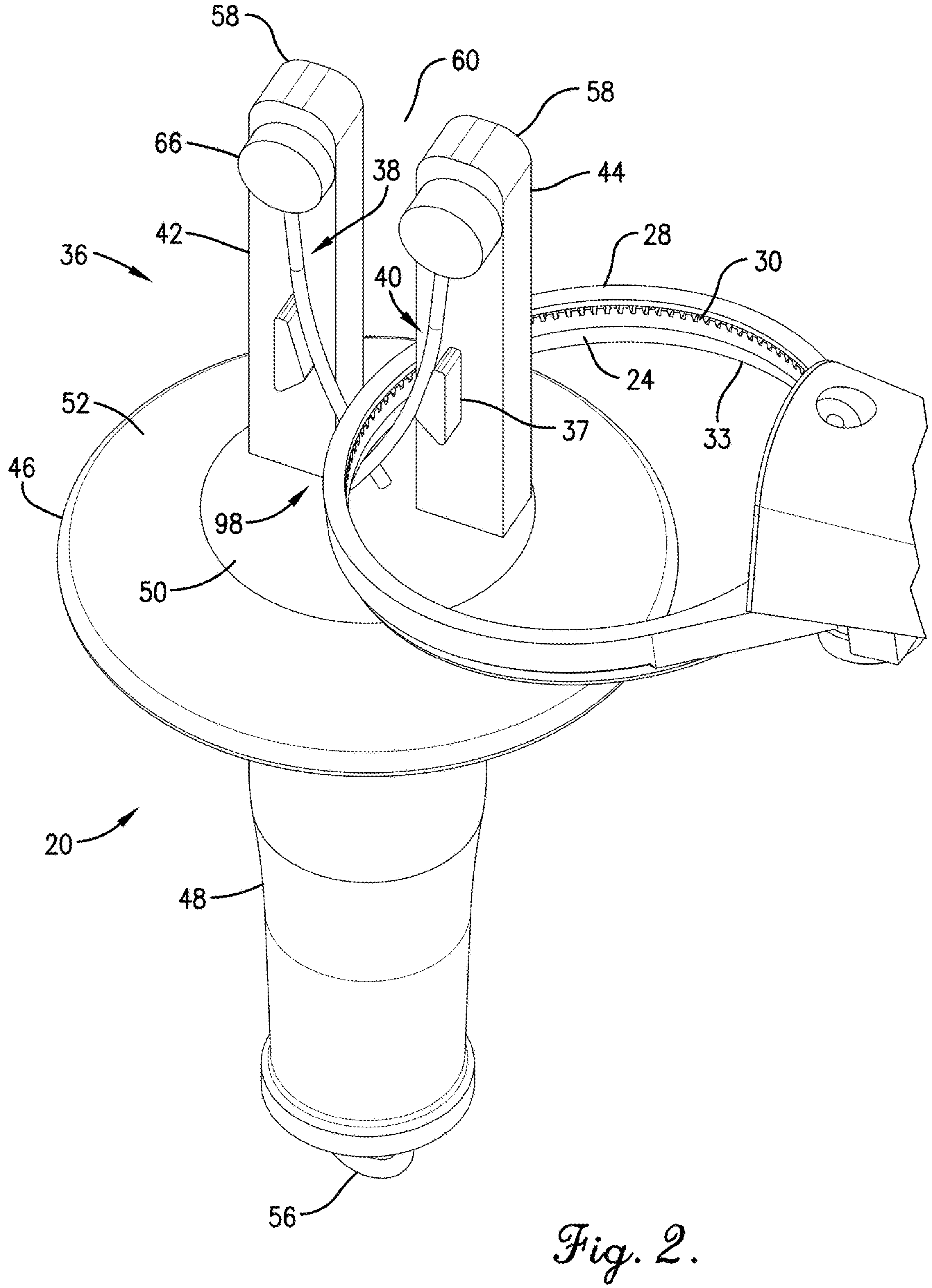
FIG. 2 is a perspective enlarged view of the steeling tool while in use with the rotary knife, depicting the knife having shifted the knife interface of the tool to a terminal interface position.
Figure 3:
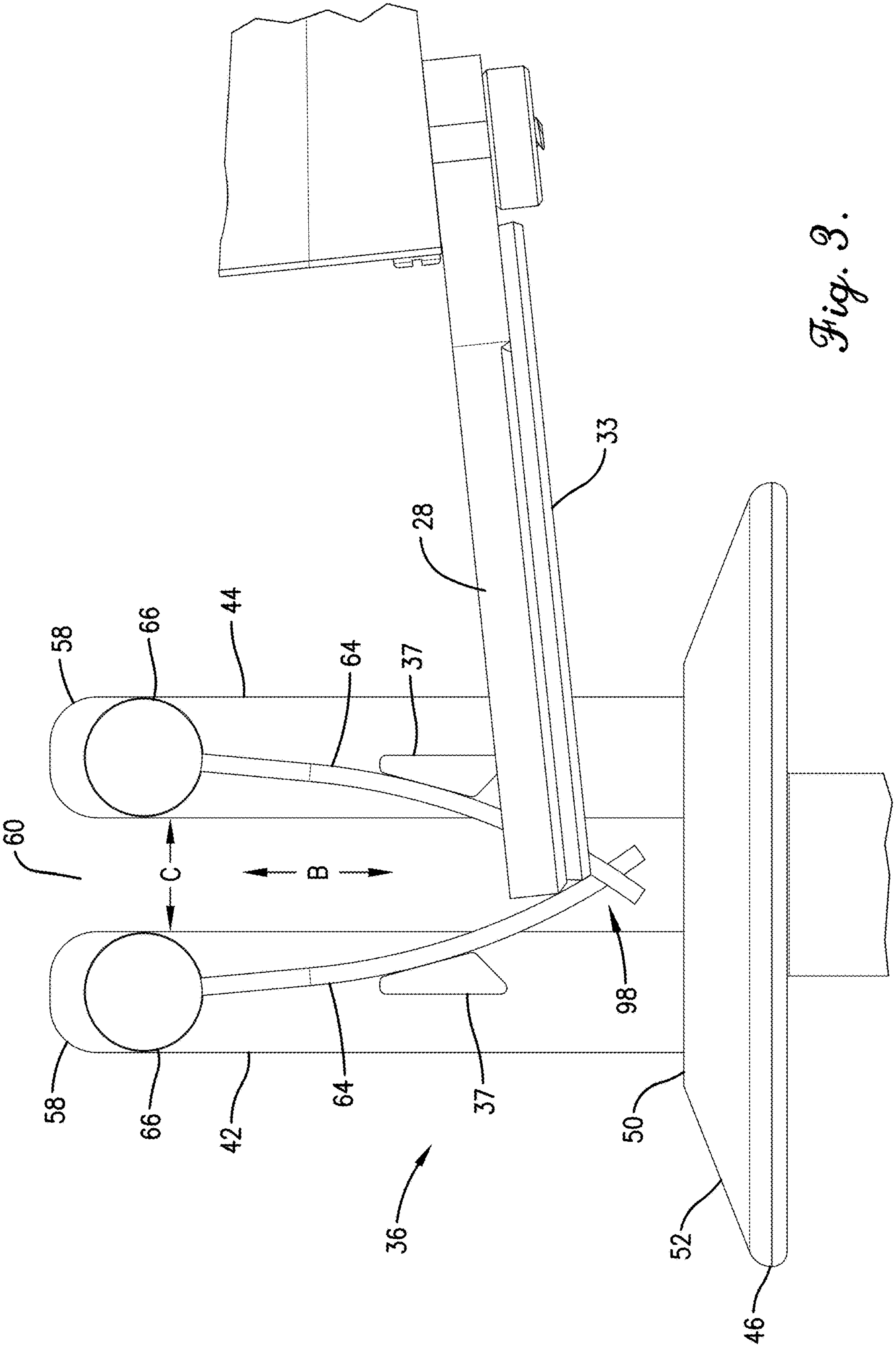
FIG. 3 is a front enlarged view of the steeling tool and rotary knife in the condition shown in FIG. 2.
Figure 4:
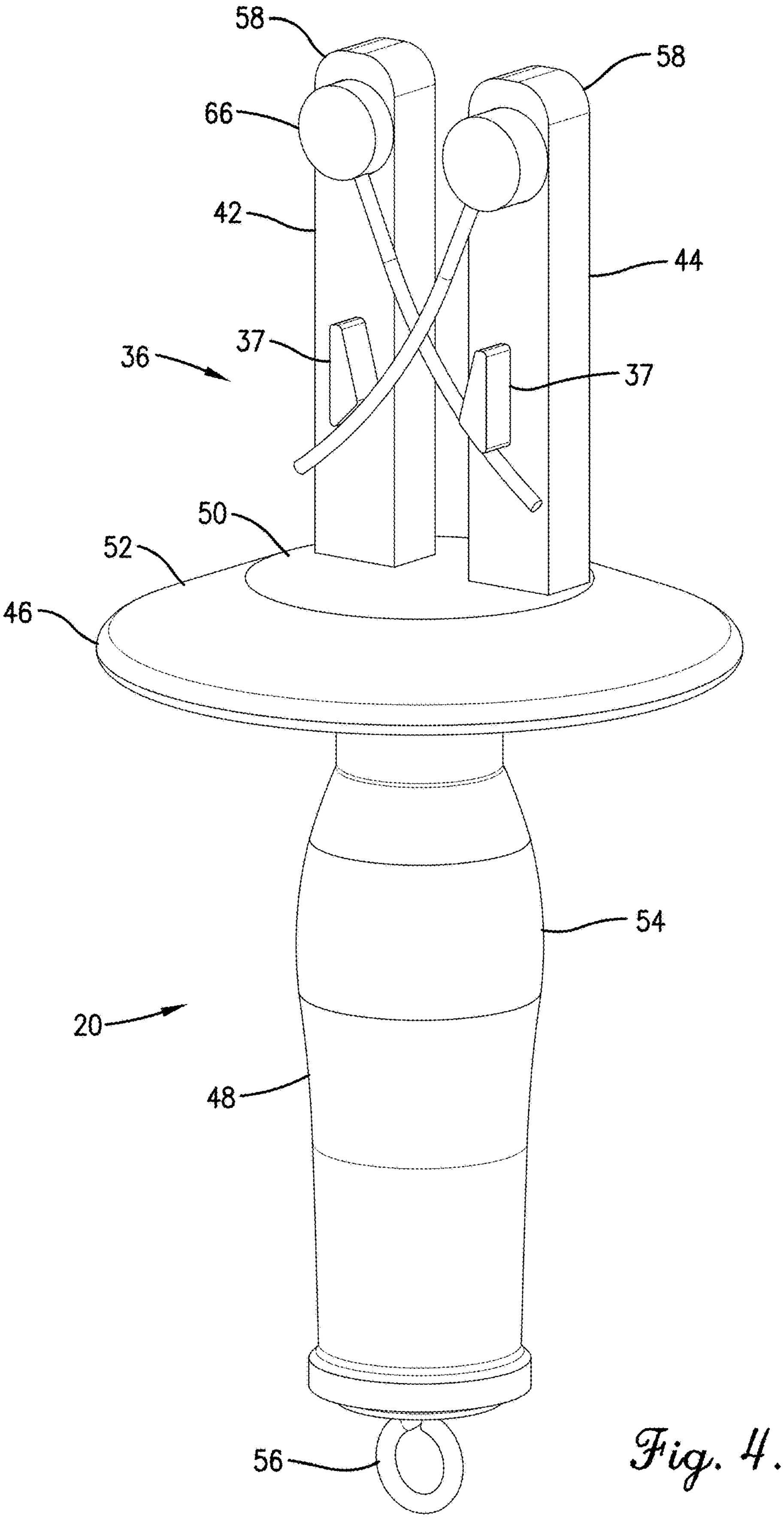
FIG. 4 is a perspective view of the steeling tool in a disengaged position, with the knife wholly removed.
Figure 5:
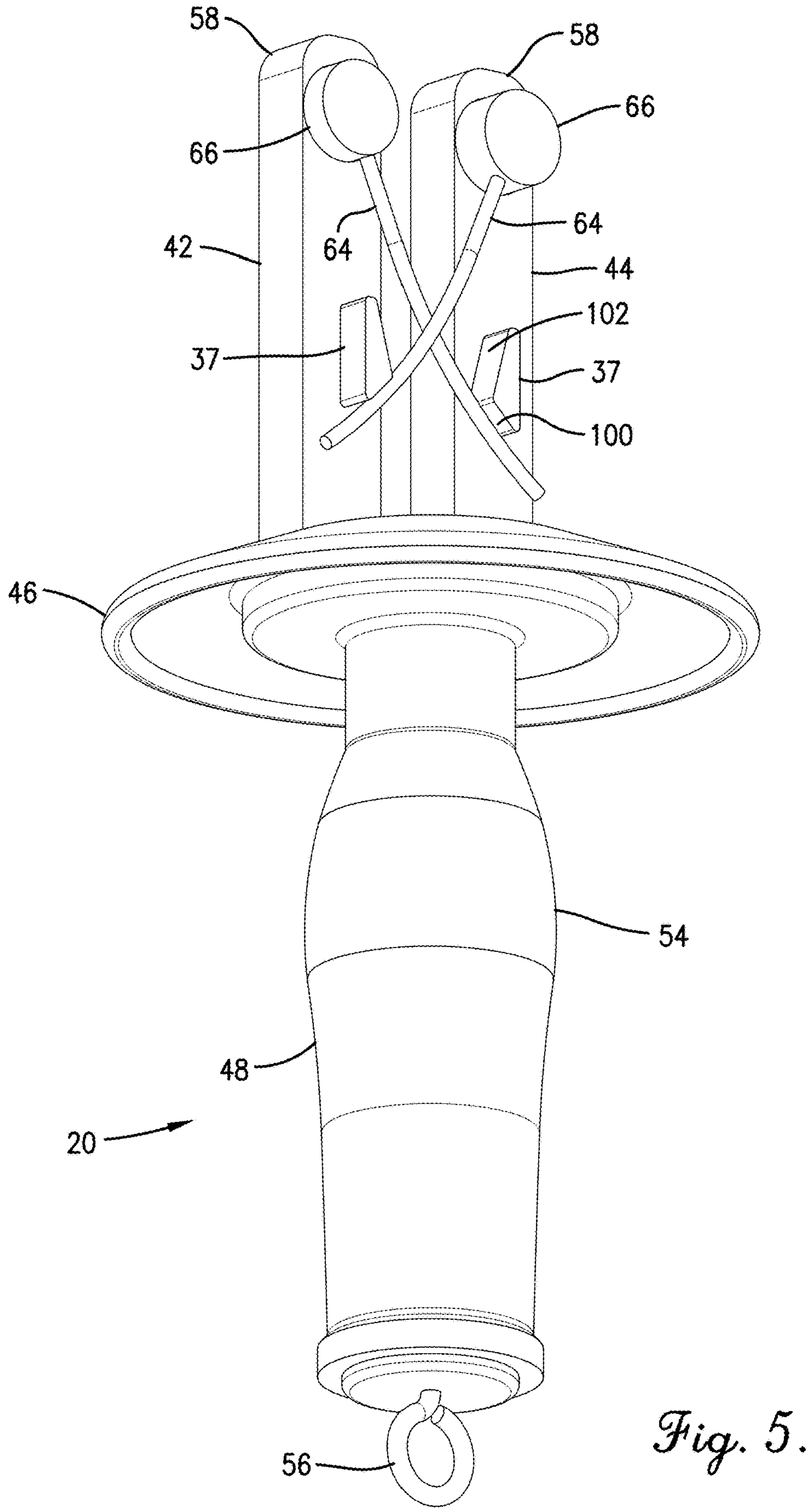
FIG. 5 is a perspective view of the steeling tool from below the steeling tool.

In one embodiment, the rotary knife 22 preferably includes an annular rotatable blade 24, a knife handle 26, and a blade housing 28 (see particularly FIGS. 1-3). The housing 28 rotatably supports the blade 24 on the main knife body 25. The blade 24 includes a ring of teeth 30 drivingly intermeshed with a pinion gear (not shown), such that rotation of the pinion gear causes rotation of the blade 24. The pinion gear is drivingly connected to a suitable power source. In the illustrated embodiment, the power source includes an electric motor (not shown) and cable or flexshaft (not shown) contained in a casing 32, although other suitable power sources (e.g., a pneumatic drive) are within the ambit of the present invention. Axially opposite the toothed ring 30 is an annular cutting edge 33. Those ordinarily skilled in the art will appreciate that the cutting edge 33 requires maintenance (e.g., steeling and sharpening) to ensure efficient knife operation.

The blade 24 is circular in shape, with the cutting edge 33 defining a central opening 34. The opening 34 customarily presents a diameter ranging between about one inch (1") and six inches (6"), although other blade dimensions are encompassed by certain principles of the present invention. As previously noted, the steel 20 is not limited to use with the illustrated rotary knife 22. For example, a straight blade knife (not shown) may also be maintained with the steel 20, according to certain aspects of the present invention.

In a preferred embodiment of the present invention, the steeling tool 20 broadly includes a frame 36, a pair of steeling component assemblies 38,40 supported on the frame 36, and a pair of spaced apart stops 37 that serve to limit operational positioning of the assemblies 38,40.

Turning initially to the frame 36, an integrally formed body preferably defines the various elements of the frame. Such preferred integral fabrication may be accomplished in any suitable manner, such as molding, casting, machining, etc. The frame 36 is preferably formed of a suitable synthetic resin material, such as plastic (including but not limited to polyethylene terephthalate, ultra high molecular weight polyethylene, etc.). However, those ordinarily skilled in the art will appreciate that certain aspects of the present invention contemplate a frame having discretely manufactured components that are then suitably assembled (e.g., using fasteners, adhesive, welding, etc.). The illustrated frame 36 broadly includes a first support member 42, a second support member 44, a base 46, and a handle 48, all of which are preferably integrally formed as noted.

The base 46 preferably presents a central, circular-shaped, flat top portion 50 and a circumferential tapered portion 52 that extends continuously around the top portion 50. The tapered portion angles in a direction toward the handle 48. In the illustrated embodiment, the support members 42, 44 project perpendicularly from the top portion of the base 50, although certain aspects of the present invention contemplate support members that project together at a different angle than ninety degrees (90°), project at different obtuse angles relative to the top portion, etc. Moreover, according to some aspects of the present invention, the base may be alternatively configured. For example, the base may alternatively present a top face that is entirely flat or angled, a tapered portion that is discontinuous (e.g., to form arcuately spaced segments), or the base may be removed altogether, without departing from the spirit of certain aspects of the present invention.

The preferred handle 48 projects from the underside of the base 46 in a direction that is generally opposite of the support members 42, 44. The handle 48 presents a curvilinear outer face 54 that is configured to be grasped by a user. The preferred handle 48 presents an overall axial length A (measured from the base to the distal tip of the handle) of about four (4) to eight (8) inches and, more preferably, about six (6) inches. One skilled in the art will recognize, however, that the certain aspects of the present invention encompass a frame having alternative handle designs or lacking a handle entirely.

In the illustrated embodiment, a hook 56 projects from the distal end of the handle 48. The illustrated hook 56 is threadably secured to the distal end of the handle, although the hook may alternatively be integrally formed with the handle or otherwise fixed in place (e.g., with adhesive, welding, snap-fit, etc.). The hook 56 is preferably provided to facilitate hanging of the tool on a belt loop, another similar user element (e.g., a pant pocket), or another supporting structure, when the tool 20 is not actively in use.

As noted, the support members 42, 44 project from the top portion 50 of the base 46, in a direction opposite the handle 48. In the illustrated embodiment, the support members 42, 44 are identically shaped and equal in dimension. That is to say, the preferred first and second support members 42, 44 have the same length and, because the top portion 50 of the base 46 is flat, present outer ends 58 that are spaced the same distance from the base. Furthermore, the support members 42, 44 have the same cross-sectional shape. Except for the outer rounded end 58, each support member 42, 44 has a continuous cross-sectional dimension, which in the illustrated embodiment is rectangular in shape. The support members 42, 44 are spaced equally from the center of the top portion 50 of the base 46, and the tapered portion of the base 52 projects radially outward from the support members 42, 44. Moreover, the support members 42, 44 define a knife-receiving slot 60 that extends lengthwise along a slot axis B (which generally corresponds and is aligned with an axis of the tool).

Because of the preferred construction of the support members 42, 44, the knife-receiving slot 60 has a constant width (or cross-sectional dimension) measured between the support members 42, 44 in a direction that is perpendicular to the slot length. However, according to certain aspects of the present invention, the support members may be alternatively configured (e.g., present other orthogonal, polygonal, or curvilinear shapes, present different shapes between the members, present shapes and/or cross-sectional dimensions that vary along the length of each support member, extend obtusely from the base, etc.), and the slot may consequently vary in configuration.

Figure 12:
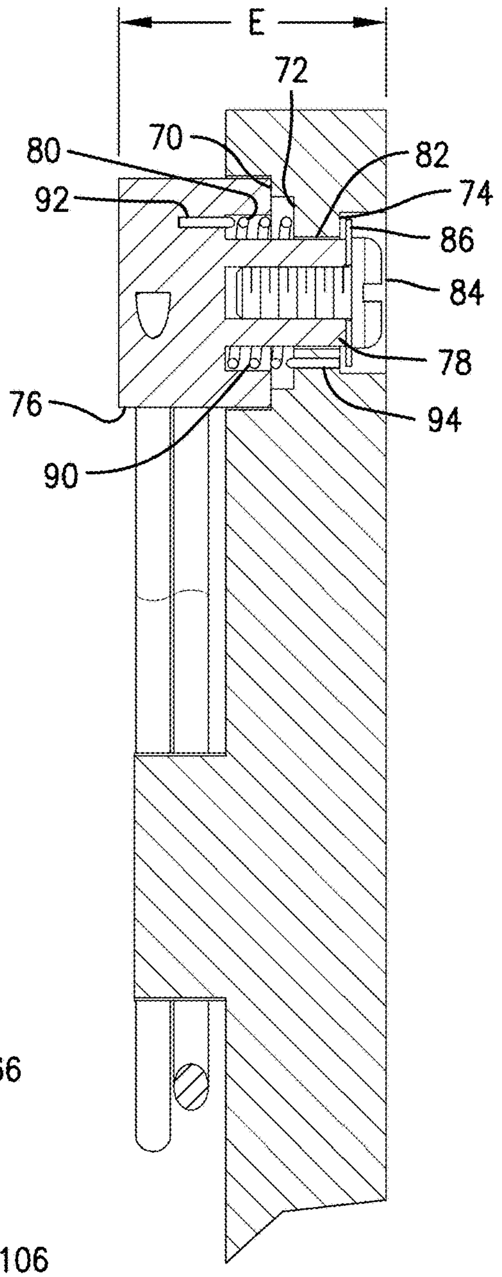
FIG. 12 is a cross-sectional view taken along line 12-12 of FIG. 11.
Figure 11:
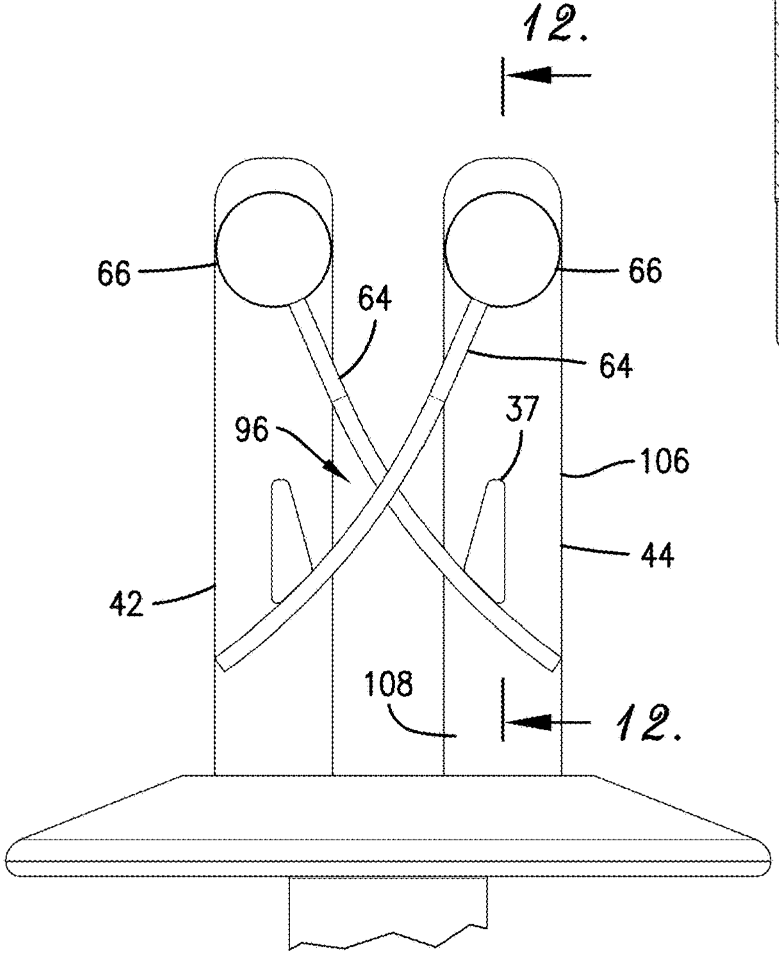
FIG. 11 is a front enlarged front view of the steeling tool.
Figure 13:
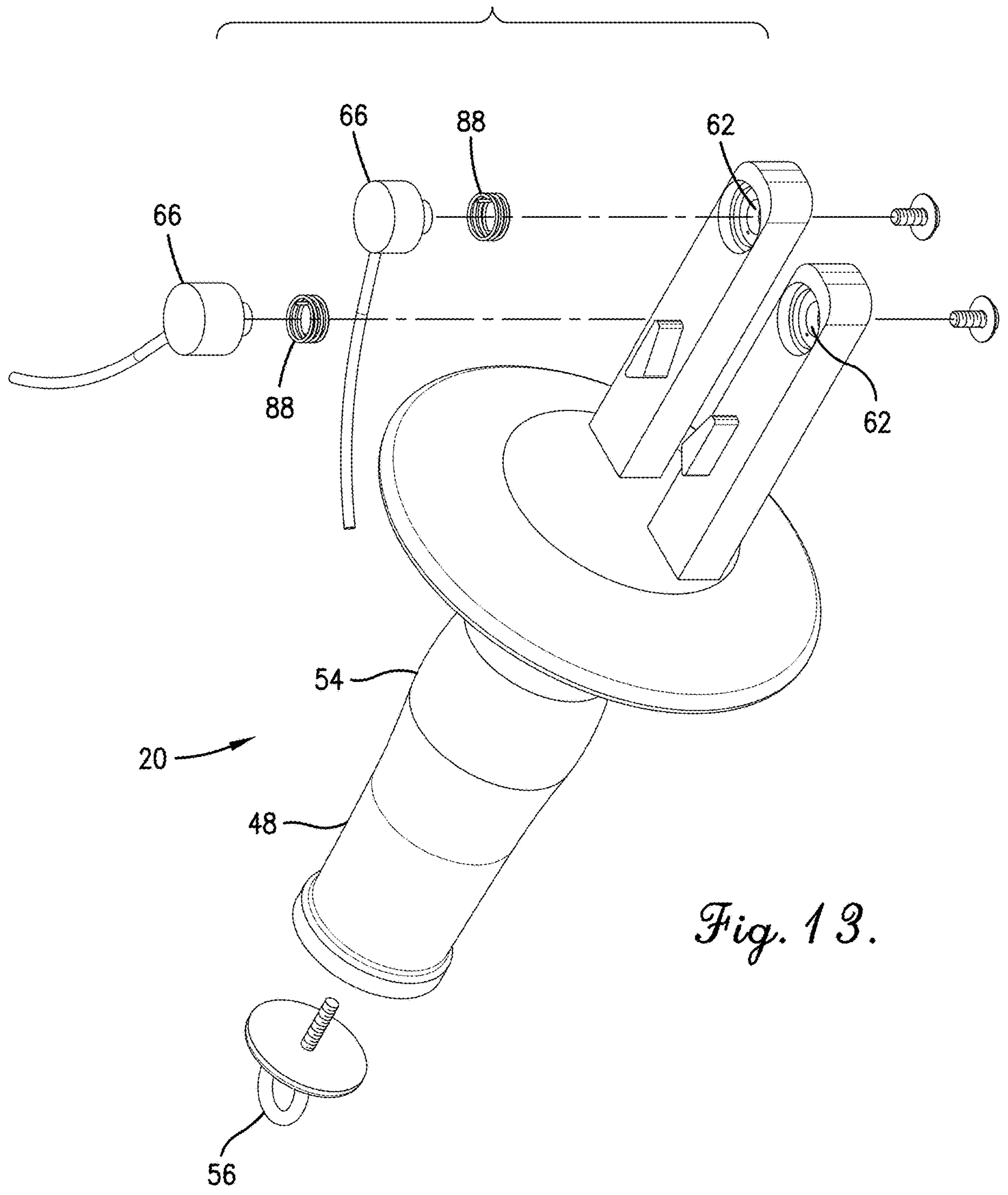
FIG. 13 is a perspective exploded view of the steeling tool.
Figure 14:
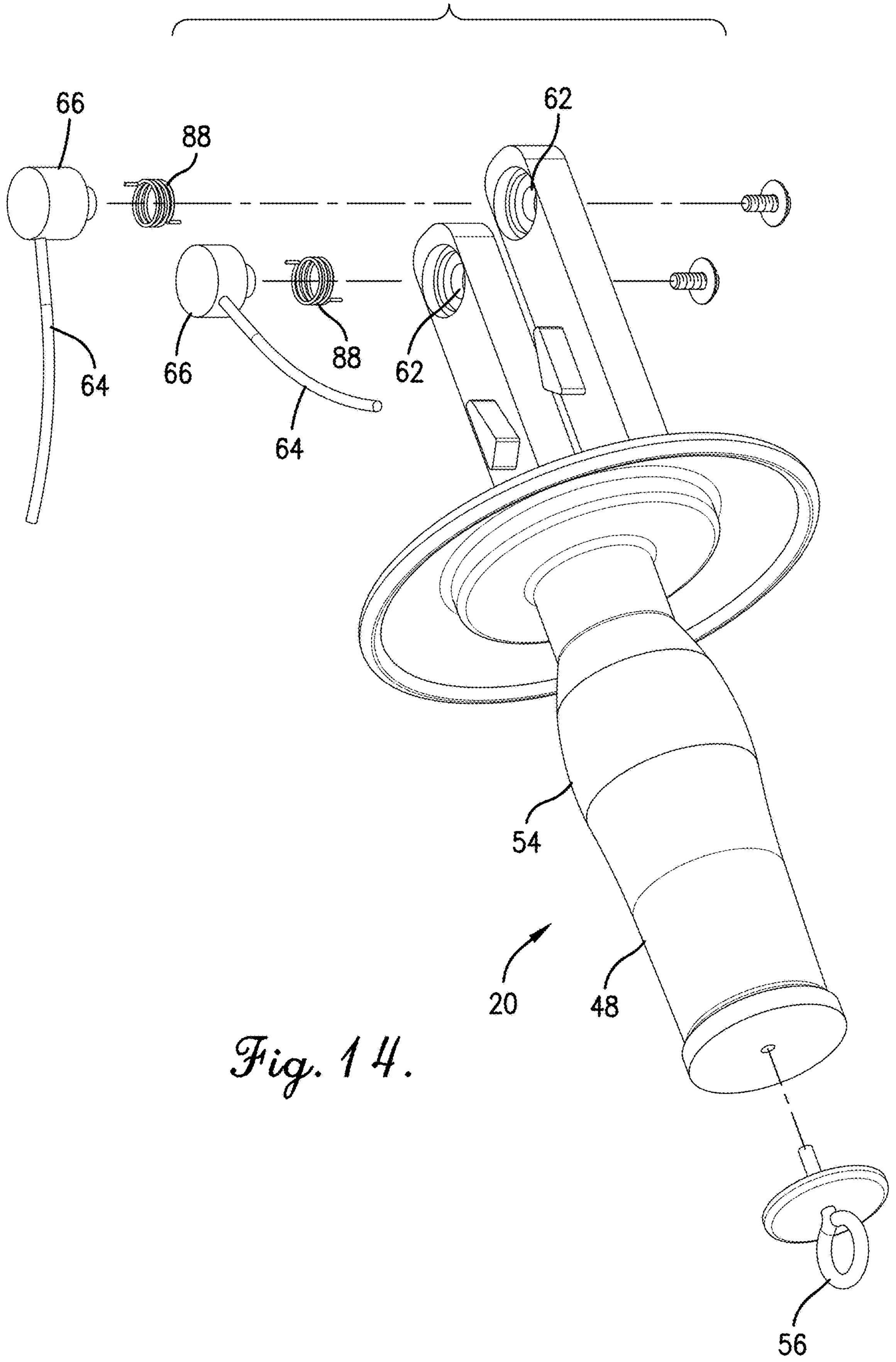
FIG. 14 is another perspective exploded view of the steeling tool.

As perhaps best shown in FIGS. 12-14, each illustrated support member 42, 44 has an aperture 62 adjacent the outer rounded end 58. (For the brake brevity, the apertures 62 are similarly numbered in the drawings.) The aperture 62 extends entirely through the support member 42, 44 (between the front and back faces of the member). The aperture 62 is preferably defined by a stepped surface 68 that presents a front shoulder 70, an intermediate shoulder 72, and a back shoulder 74. The purposes of the apertures and shoulders will be explained further below.

Each of the illustrated steeling component assemblies 38, 40 is supported on a respective one of the support members 42, 44. The steeling component assemblies 38, 40 include steeling components 64 which engage the cutting edge 33 of the knife 22 during steeling operations. (For the brake brevity, the steeling components 64 are similarly numbered in the drawings.) In the preferred embodiment, the steeling components 64 are each slightly curved along their length and present a circular cross-sectional shape. Each steeling component 64 is preferably formed of a wire-like metal material, although other shapes, sizes, configurations (e.g., each or one of the components comprising a double-wire construction), and material types are within the ambit of certain aspects of the present invention. Other than the steeling components 64 being slightly offset in a fore-and-aft direction to accommodate overlapping, the steeling component assemblies 38, 40 are essentially mirror images of one another. Therefore, for the sake of brevity, the description of each steeling component assembly 38, 40 (particularly with respect to the connection to the corresponding support member) will be limited to the assembly shown in FIG. 12, with the understanding that the other assembly is similarly constructed.

The preferred steeling component assembly 38, 40 includes a post 66 to which the steeling component 64 is secured. As will be explained, the post 66 is rotatably supported on the respective support member 42, 44. The steeling component 64 is secured to the post 66 in any suitable manner (e.g., friction-fit, adhered, integrally formed, etc.) so that rotation of the post 66 corresponds with swinging movement of the component 64. The post 66 is preferably formed of the same material as the frame 36, although alternative post materials are within the scope of certain aspects of the present invention. The preferred post 66 is generally cylindrical in shape and includes a base portion 76 (defining the outermost cylindrical surface of the post 66) and a central flanged portion 78 projecting beyond the base portion. The base portion 76 and flanged portion 78 are spaced apart so as to define an annular recess 80. The base portion 76 of the post 66 is rotatably received in the aperture 62, with the inner end of the base portion 76 slidably engaging the front shoulder 70 to thereby limit (in the axial direction of the aperture) positioning of the post 66 within the aperture 62. The flanged portion 78 extends beyond the intermediate shoulder 72 and preferably also rotatably engages an aperture-defining surface 82 between the intermediate shoulder 72 and the back shoulder 74. The inner end of the flanged portion 78 preferably aligns (at least substantially) with the back shoulder 74. A threaded fastener 84 (preferably including a washer 86) is received in the flanged portion of the post 66. The fastener 84 engages the back shoulder 74 to secure the post 66 within the aperture 62.

The steeling component assembly 38, 40 preferably also includes a spring 88 for resiliently biasing the corresponding post 66, and thereby the corresponding steeling component 64, in a desired direction, as will be described. The illustrated spring 88 is located within the aperture 62 between the post 66 and support member 42, 44. More particularly, the preferred spring 88 includes a coil 90 extending between first and second spring ends 92, 94. The first spring end 92 is secured to the post 66 and the second spring end 94 is secured to the support member 42, 44, with the coil 90 preferably encircling the flanged portion 78. According to certain aspects of the present invention, the spring may be alternatively constructed (e.g., comprise a leaf spring, be integrated into the steeling component, etc.).

When viewing the front of the tool (e.g., FIGS. 3, 6, 10, and 12), the springs 88 are arranged so that the steeling components 64 are biased toward one another. (In other words, when viewing the tool 20 from the front, the left post 66 is yieldably urged in a counterclockwise direction and the right post 66 is yieldably urged in a clockwise direction.) Again, the steeling components 64 are offset in a fore-and-aft direction so as to overlap one another and avoid any interference of relative swinging therebetween.

Figure 6:
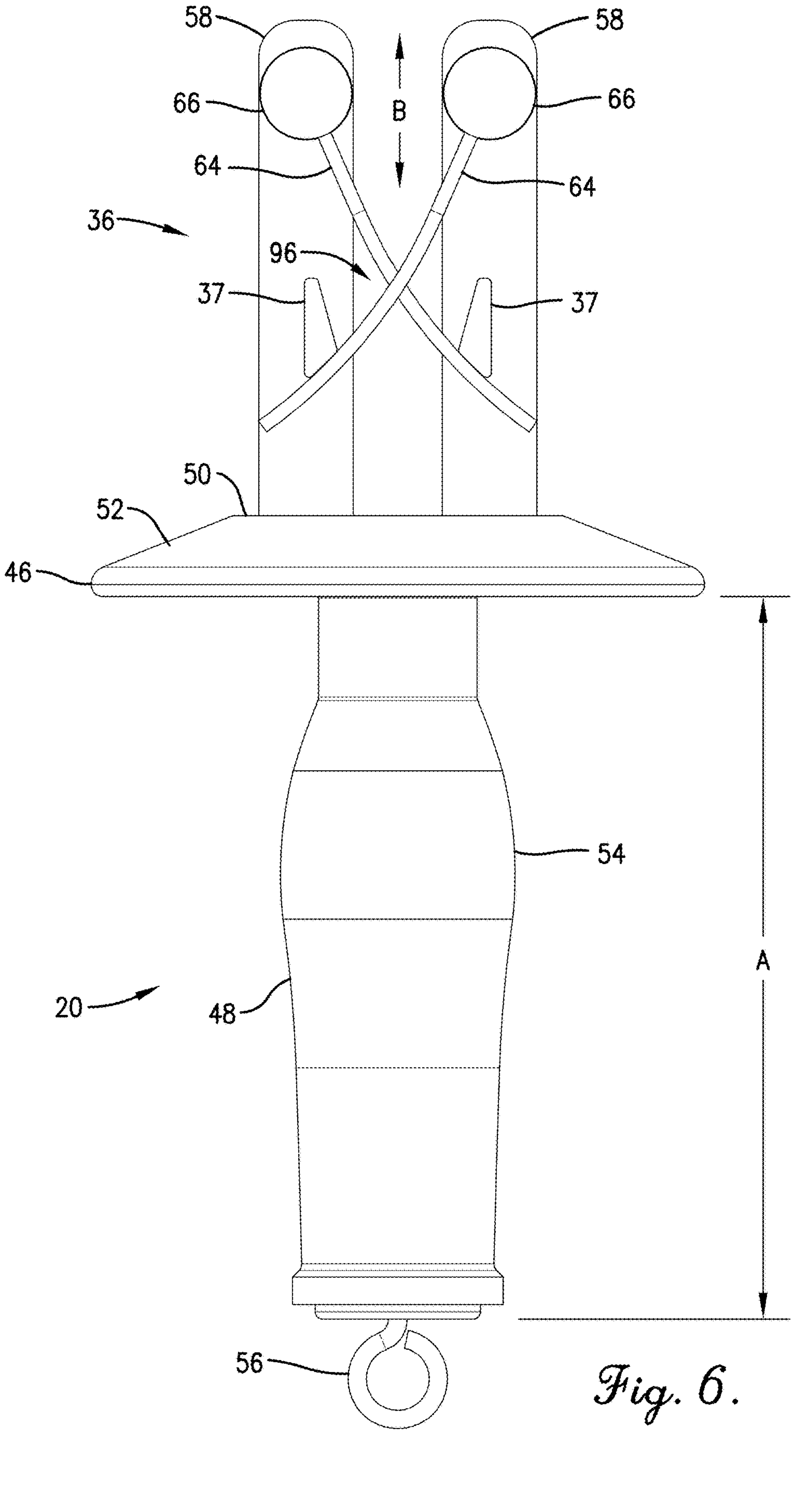
FIG. 6 is a front view of the steeling tool in the disengaged position.
Figure 7:
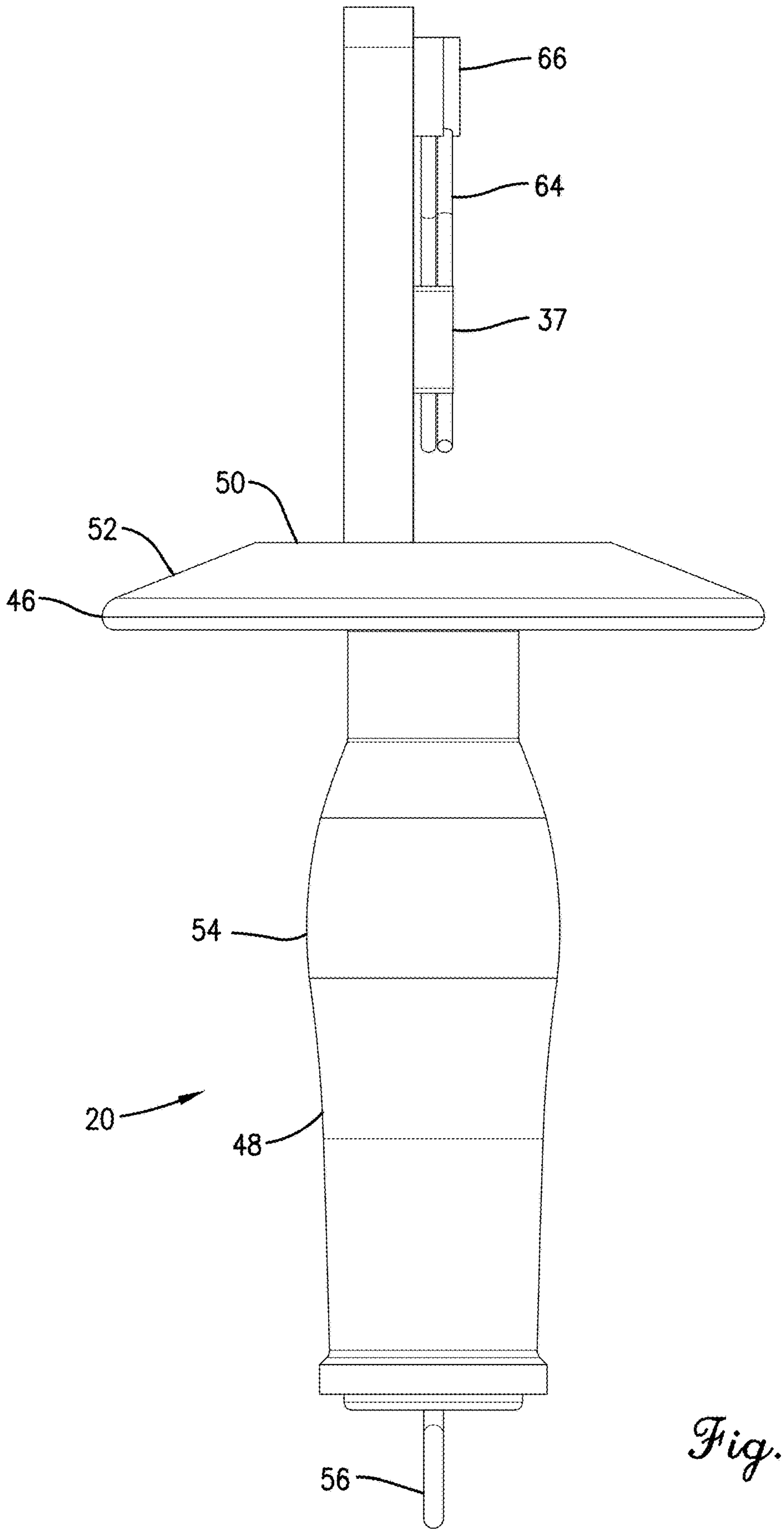
FIG. 7 is a side view of the steeling tool.
Figure 8:
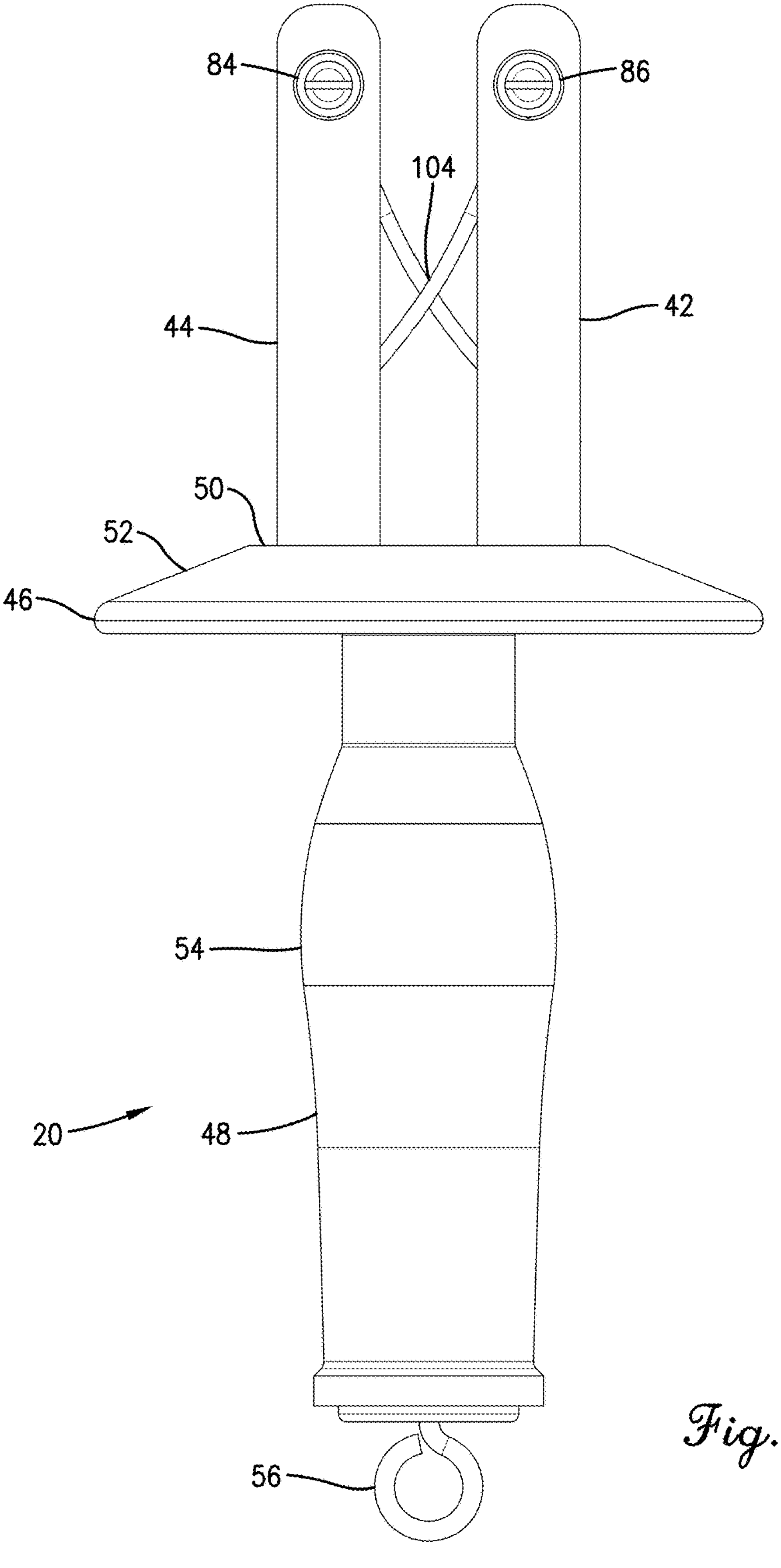
FIG. 8 is a rear view of the steeling tool.
Figure 9:
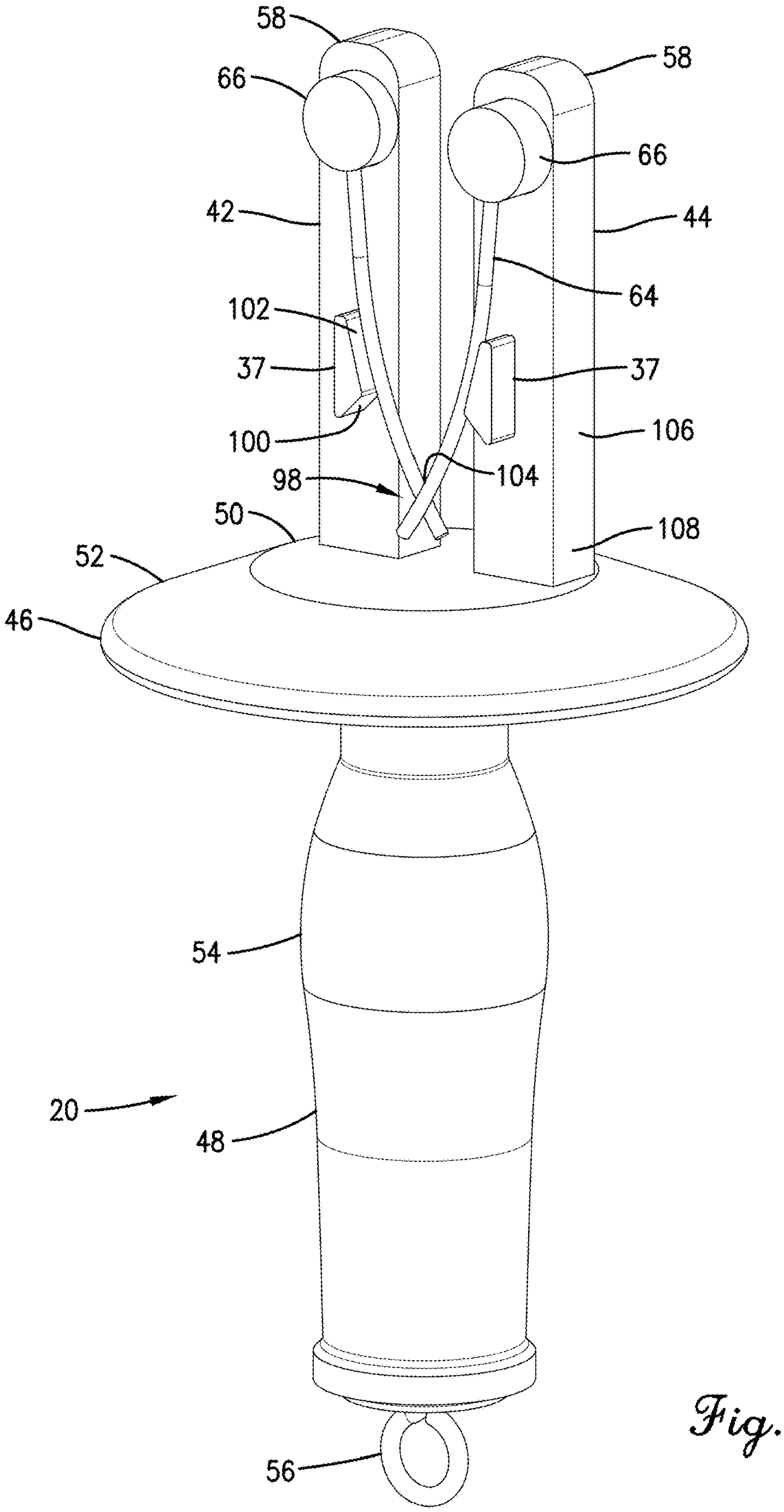
FIG. 9 is a perspective view of the steeling tool, with the knife removed, but showing the steeling components located in positions corresponding to the terminal interface position of the knife interface.
Figure 10:
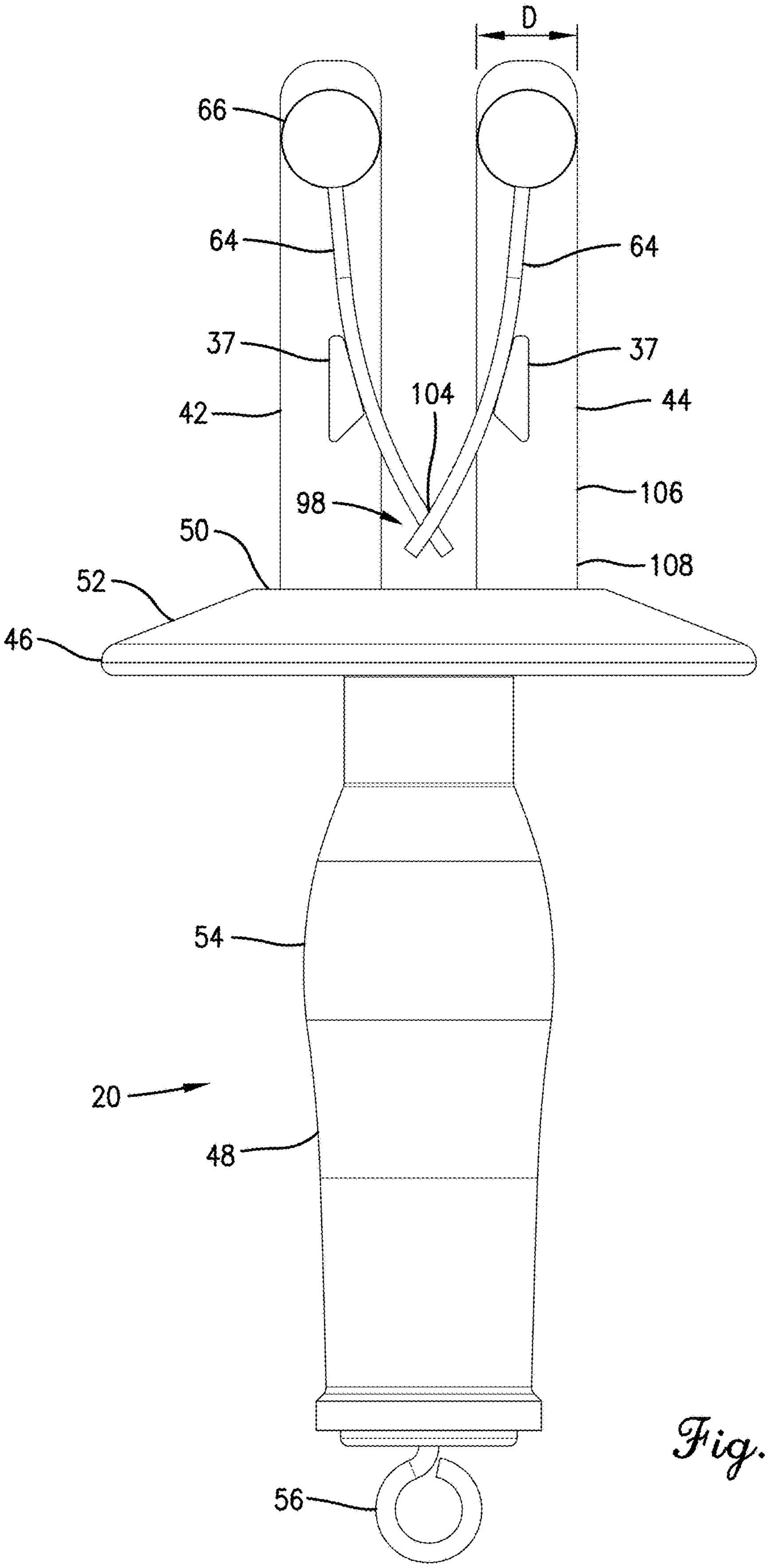
FIG. 10 is a front view of the steeling tool as shown in FIG. 9.

As noted, the illustrated stops 37 are provided to limit operational positioning of the steeling component assemblies 38,40. More particularly, each preferred stop 37 is configured to engage both of the steeling components 64. As shown in FIG. 6, each of the steeling components 64 has been biased into a first position 96, wherein the component contacts the stop 37 on the other support member 42, 44. Each steeling component 64 may be shifted against the bias of the corresponding spring 88 into a second position 98, in which the steeling component 64 contacts the stop 37 on corresponding support member 42, 44 (see FIG. 10). Therefore, the stops 37 cooperate to limit swinging of each steeling component 64 between the first and second positions 96, 98.

The preferred stops 37 are fixed to respective support members 42, 44 to project forwardly therefrom. Most preferably, each stop 37 is integrally formed with the corresponding support member 42, 44, although certain aspects of the present invention contemplate separately formed stops that are suitably secured to the respective support members (e.g., using adhesive, welding, fasteners, etc.).

In the illustrated embodiment, each stop 37 is a mirror image of the other, and the same reference numbers will be used to describe the features of each stop 37. Each illustrated stop 37 includes a pair of component-engaging surfaces 100, 102. The first component-engaging surface 100 faces generally downward toward the base 46 and contacts the opposite steeling component 64 when in the first position 96 (see FIG. 6). The second component-engaging surface 102 faces generally toward the other stop 37 and contacts the steeling component 64 mounted on the same support member 42, 44 when in the second position 98 (see FIG. 10). Because of the generally arcuate shape of the steeling components 64, the surfaces 100, 102 preferably have a complemental arcuate shape so that components 64 rest flush against the surfaces 100, 102. Except for this slight curvature, it may be said that the component-engaging surfaces of each stop 37 are angled relative to one another. The angle 104 defined between the surfaces 100, 102 is preferably between zero and one hundred eight degrees (0-180) and, more preferably, between ninety and one hundred eighty degrees (90-180). However, alternative stop configurations are with certain aspects of the present invention. For example, the stops may alternatively be shaped (e.g., have a simply pin or cylindrical shape) or may be located alternatively on the respective support member, without departing from the spirit of certain aspects of the present invention. Furthermore, according to some aspects of the invention, the stops may be alternatively shaped and/or located so as to vary the location of the first and second positions of on one or both of the steeling components or to engage only the steeling component supported on the same support member (rather than have each stop engage the steeling component supported on the opposite support member, as shown). Yet further, certain aspects of the present invention contemplate altogether eliminating the stops (or at least not restricting swinging movement of one or both of the steeling components in one direction).

The steeling components cooperatively define a knife interface 104 at the location at which the steeling components overlap, with the knife-interface 104 consequently being located within the knife-receiving slot 60. The interface 104 is designed to engage the cutting edge 33 and thereby steel (otherwise known as revive or align) the edge 33. Those ordinarily skilled in the art will appreciate that the interface 104 moves as the steeling components 64 shift between the first and second positions 96, 98 (compare FIGS. 6 and 10). It may be said that the knife interface 104 is in a disengaged position ready to be contacted by the cutting edge when the steeling components are in the first position 96 (see FIG. 6), and the knife interface is in a relatively inwardly spaced terminal position when the steeling components are in the second position 98 (see FIG. 10). Shifting of the knife interface 104 along the knife-receiving slot 60 between the disengaged and terminal positions is effected by movement of the knife 22 and the bias of the springs 88. As perhaps best shown in FIGS. 1-3, the knife interface 104 is shifted from the disengaged position toward the terminal position by bringing the cutting edge 33 into contact with the interface 104 and moving the cutting edge 33 progressively inward into the knife-receiving slot 60. The springs 88 serve to maintain contact between the steeling components 64 and cutting edge 33. Eventually, sufficient inward movement of the blade 24 within the knife-receiving slot 60 will cause the knife interface 104 to "bottom out" at the terminal position, once the steeling components 64 contact the respective second component-engaging surfaces of the stops 102. Once the blade 24 is moved outwardly along the knife-receiving slot 60, the springs 88 continue to urge the steeling components 64 against the cutting edge 33 and back toward the first position 96. If desired, during a steeling operation, the blade 24 may be reciprocated back and forth along the slot 60 while engaging one or both of the steeling components 64. It will also be understood that the steeling components 64 may not move symmetrically between their respective first and second positions 96, 98. For example, if the user positions the blade 24 closer to one support member 42, 44 than the other, the steeling component 64 supported on the one support member 42, 44 might move more than (and even bottom out in the second position 98 before) the other steeling component 64. Eventually, once the blade 24 is removed from the knife-receiving slot 60 and disengaged from the interface 104, each steeling component 64 is returned to the first position 96. It shall be understood that the location of the disengaged and terminal positions is dictated by the interaction of the steeling components 64 and stops 37, and the locations of the disengaged and terminal positions may consequently be varied by altering such interaction, as previously described.

In the illustrated embodiment, inward blade movement within the knife-receiving slot 60 is limited by the location of the terminal interface position. More particularly, because the knife interface 104 bottoms out at the terminal position, the blade 24 is not permitted to move inwardly any further. (Again, according to some aspects of the present invention, such limiting of blade movement within the slot 60 is not required.) It may consequently be said that each support member 42, 44 defines an outer portion 108 that extends outwardly relative to the terminal interface position. In particular regard to the illustrated embodiment, the outer portion 10 of the support member 42, 44 extends from a point that is aligned (along the slot axis) with the terminal interface position to the distal end of the member.

It has been determined that, with respect to steeling of rotary knives, the dimensions of the outer portion 108 of at least one of the support members 42, 44 is important. More particularly, in order to permit steeling of rotary knives 22, the relative sizing of the knife-receiving slot 60 and the outer portion 108 of at least one of the support members 42, 44 has been determined to provide a tool 20 capable of steeling rotary knives 22— a function unavailable to conventional steel designs. The knife-receiving slot 60 defines a cross-sectional dimension C measured between the support members 42, 44. (Although the slot 60 also has a fore-and-aft dimension measured between the aligned front and back faces of the support members 42, 44, the greater dimension is defined between the support members 42, 44 and will consequently be referred to herein as the cross-sectional dimension C. However, according to some aspects of the present invention, the slot cross-sectional dimension [at least in terms of a "maximum"] may be measured in a fore-and-aft or other direction). The outer portion 106 of each support member 42, 44 defines a cross-sectional dimension D that is perpendicular to the slot length. In the illustrated embodiment, because the support members 42, 44 are identical in shape, extend perpendicularly from the base 46, and are spaced apart equally along their length, the slot cross-section dimension C (measured at a right angle relative to the slot axis) is constant, and the cross-sectional dimension D of the outer portion 106 (apart from the rounded end) is similarly constant. However, as previously noted, certain aspects of the present invention contemplate different slot and support member shapes and configurations and therefore variable cross-sectional dimensions. It has specifically been determined that the maximum cross-sectional dimension D of the outer portion 106 of the at least one support member 42, 44 be less than about two (2) times the maximum cross-sectional dimension C of the of the slot 60. With the constant spacing between the support members 42, 44, the slot width C (and therefore the maximum cross-sectional dimension) is about three-quarter inch (¾") to about one and one-quarter inches (1¼"). Each outer portion 106 of the support member 42, 44 is rectangular in shape (with the lateral (width) dimension being greater than the fore-and-aft dimension (thickness)), and the maximum cross-sectional dimension (width) is about between one-quarter inch (¼") and three-quarter inch (¾"). Most preferably, the widths of the slot 60 and the outer portion of the support member 106 are no more than about three-quarter inch (¾").

It is further noted that the illustrated post 66 adds to the overall cross-sectional dimension of each assembled support member 42, 44 and steeling component assembly 38, 40. In the illustrated embodiment, the post 66 has a diameter (width) that generally corresponds to the lateral (width) dimension of the outer portion 106 of the support member 42, 44. However, the thickness of the post 66 (measured in a fore-and-aft direction) cooperates with the thickness of the outer portion 106 of the support member 42, 44 to define a combined post-support member cross-sectional dimension E that is greater than the width of the outer portion 106 of the support member 42, 44. It has been determined that the maximum post-support cross-sectional dimension E be less than about three (3) times the maximum slot cross-sectional dimension C. As previously noted, certain aspects of the present invention contemplate alternative (or entirely removed) post configurations, and the relationship between any combined post-support maximum cross-sectional dimension and the maximum slot cross-sectional dimension is preferably maintained. Along these lines, if in an alternative embodiment the fastener was not recessed within the support member but rather projected outwardly beyond the back face of the support member, this additional thickness (added to the overall cross-sectional dimension) would still satisfy the inventive relationship.

Each support member 42, 44 defines an inner portion 108 extending inwardly from the outer portion 106 (or the terminal position of the knife interface 104) to the base 46. In the illustrated embodiment, because the knife 22 is prevented from moving inwardly past the terminal interface position, the inner portion of the base 46 need not be limited to the dimensions noted above. For example, the principles of the present invention contemplate the inner portion of each 108 support member 42, 44 having a maximum cross-sectional dimension that is more than two (2) times greater than the maximum slot cross-sectional dimension C. In some embodiments, the inner portion 108 of each support member 42, 44 may be altogether eliminated.

In regard to use of the tool 20 to steel rotary knives 22, those of ordinary skill in the art will understand that the blade 24 must be received over only one of the support members 42, 44. Therefore, certain aspects contemplate a tool having only one of the support members dimensioned in the manner described above. That is to say, according to some principles of the present invention, it is only necessary for one of the steeling component assemblies to be supported on a support member configured to be received within the central blade opening of the rotary knife. The use of the tool 20 shall be apparent from the foregoing description. Suffice it to say, the illustrated tool 20 is grasped by a user, and a knife (such as the rotary knife 22) is brought into operable engagement with the tool 20. If the knife 22 is held in one hand and the tool in another, this may be accomplished by moving both the knife 22 and tool 20 toward one another. Of course, it is also possible to hold one of the items stationary (e.g., the tool 20), and move the other (e.g., the knife 22) relative thereto. With the knife interface 104 in the disengaged position, the cutting edge 33 is initially brought into engagement with the interface 104. To ensure steeling contact between the cutting edge 33 and steeling components 64, the cutting edge 33 is shifted progressively into the knife-receiving slot 60. At some point, if the cutting edge 33 has been moved far enough into the knife-receiving slot 60, one or both of the steeling components 64 will engage the respective stop(s) 37. As previously noted, the cutting edge 33 may be moved inwardly and outwardly relative to the slot 60 multiple times during the steeling operation. Once the cutting edge 33 has been adequately steeled, the blade 24 is removed from the slot 60, and the steeling components 64 are biased back into the first position 96 (corresponding to the disengaged position of the knife interface 104). When steeling the illustrated rotary knife 22, one of the support members 42, 44 is received into the blade opening 34. While the blade 24 is rotating, the cutting edge 33 engages the knife interface 104 as described above. Preferably, a plane defined by the blade 24 (the plane being perpendicular to the blade rotational axis) is maintained generally perpendicular to the slot axis B, although an obtuse angular relationship is within the scope of certain aspects of the present invention. During steeling operations, the base 46 serves to protect the user's hand from inadvertent contact with the cutting edge 33.

Features of one or more embodiments described above may be used in various combinations with each other and/or may be used independently of one another. For instance, although a single disclosed embodiment may include a preferred combination of features, it is within the scope of certain aspects of the present invention for the embodiment to include only one (1) or less than all of the disclosed features, unless the specification expressly states otherwise or as might be understood by one of ordinary skill in the art. Therefore, embodiments of the present invention are not necessarily limited to the combination(s) of features described above.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

The inventors hereby state their intent to rely on the Doctrine of Equivalents to determine and access the reasonably fair scope of the present invention as pertains to any apparatus not materially departing from but outside the literal scope of the invention.

We claim:

1. A tool for steeling a knife, the tool comprising:

a frame;

a first steeling component and a second steeling component, each being shiftably mounted relative to the frame for movement between a first position and a second position, said steeling components cooperatively defining a knife interface configured to engage and thereby steel the knife, said steeling components being resiliently biased into the first position, with the knife interface moving as the steeling components shift between the first and second positions; and a stop stationary relative to the frame, said stop engaging the first steeling component when in the first position and engaging the second steeling component when in the second position.

2. The tool of claim 1, said stop presenting a first component-engaging surface configured to contact the first steeling component and a second component-engaging surface configured to contact the second steeling component.

3. The tool of claim 2, said component-engaging surfaces being angled relative to one another.

4. The tool of claim 1, a second stop spaced from the first-mentioned stop, said second stop being stationary relative to the frame, said second stop engaging the first steeling component when in the second position and engaging the second steeling component when in the first position.

5. The tool of claim 4, said frame including spaced apart first and second support members, each of said stops being fixed relative to a corresponding one of the support members.

6. The tool of claim 5, each of said stops being integrally formed with the corresponding one of the support members.

7. The tool of claim 5, said first steeling component being supported by the first support member, said second steeling component being supported by the second support member.

8. The tool of claim 7, said first and second support members defining an elongated slot therebetween, said knife interface being aligned with and moving along the slot.

9. The tool of claim 1, further comprising:

a first steeling component assembly including the first steeling component; and a second steeling component assembly including the second steeling component, each of said steeling component assemblies including a post rotatably coupled to the frame, said respective post being interconnected to the respective steeling component for rotation therewith, with the respective post serving to support the respective steeling component on the frame.

10. The tool of claim 9, each of said steeling component assemblies including a spring operably intercoupled between the respective post and the frame to resiliently bias the respective steeling component into the first position.

11. The tool of claim 10, each spring comprising a coil extending between opposite first and second ends, with the first end being secured to the respective post and the second end being secured to the frame, said respective post presenting a flanged portion, said coil encircling the flanged portion.

12. The tool of claim 11, said frame including spaced apart first and second support members, said respective post being secured to a respective one of the support members, said second end of the respective spring being secured to the respective one of the support members.

13. The tool of claim 12, each supporting member defining an aperture, said flanged portion of the respective post and said coil of the respective spring being located within the aperture of the respective one of the support members.

14. The tool of claim 13, each of said steeling component assemblies including a fastener that extends into the aperture and is connected to the respective post.

15. The tool of claim 1, said frame including a handle configured to be grasped by a user.

16. The tool of claim 15, said frame including a base, said frame including spaced apart first and second support members that extend from the base, said handle extending from the base in a direction generally opposite the support members.

17. The tool of claim 16, said first and second support members defining an elongated slot therebetween, said slot extending along a slot axis, said knife interface being aligned with and moving along the slot axis, said base projecting radially relative to the slot axis beyond the support members.

18. A tool for steeling a knife, the tool comprising:

a frame, said frame including first and second support members, said support members defining an elongated knife-receiving slot;

a first steeling component and a second steeling component supported on the first and second support members, respectively, said first and second steeling components being resiliently biased toward one another to define a knife interface configured to engage and thereby steel the knife, said knife interface moving inwardly along a length of the knife-receiving slot to a terminal interface position, as the knife engages the interface and is shifted inwardly through the knife-receiving slot, said knife-receiving slot having a maximum slot cross-sectional dimension defined between the support members, at least one of said support members presenting an outer member portion extending along the knife-receiving slot outwardly relative to the terminal interface position, said outer member portion having a maximum member cross-sectional dimension defined generally perpendicular to the length of the knife-receiving slot, said maximum member cross-sectional dimension being less than about two times the maximum slot cross-sectional dimension, said knife interface being located at a disengaged interface position spaced outwardly relative to the terminal interface position, prior to the knife engaging the interface, each of said steeling components being shiftable between a first position, corresponding with the disengaged interface position, and a second position, corresponding with the terminal interface position, and a stop stationary relative to the frame, said stop engaging the first steeling component when in the first position and engaging the second steeling component when in the second position.

19. The tool of claim 18, said maximum member cross-sectional dimension being no more than about ¾ inches, said maximum slot cross-sectional dimension being no more than about ¾ inches.

20. The tool of claim 18, said outer member portion of said at least one of the support members extending continuously between the terminal interface position to an outer end of the knife-receiving slot, said outer member portion maintaining a constant shape along a length of the outer member portion.

21. The tool of claim 20, said first support member and said second support member being substantially similar in shape.

22. The tool of claim 21, said first support member and said second support member having an orthogonal shape.

23. The tool of claim 22, said orthogonal shape being rectangular.

24. The tool of claim 18, a second stop spaced from the first-mentioned stop, said second stop being stationary relative to the frame, said second stop engaging the first steeling component when in the second position and engaging the second steeling component when in the first position.

25. The tool of claim 24, each of said stops being fixed relative to a corresponding one of the support members.

26. The tool of claim 24, each stop presenting a first component-engaging surface configured to contact the first steeling component and a second component-engaging surface configured to contact the second steeling component, said component-engaging surfaces being angled relative to one another.

27. The tool of claim 18, said frame including a handle configured to be grasped by a user.

28. The tool of claim 27, said frame including a base, said first and second support members extending from the base, said handle extending from the base in a direction generally opposite the supporting members.

29. The tool of claim 28, said base projecting radially relative to a slot axis beyond the support members.

30. The tool of claim 18, a first steeling component assembly including the first steeling component; and a second steeling component assembly including the second steeling component, each of said steeling component assemblies including a post rotatably coupled to the frame, said post being interconnected to the respective steeling component for rotation therewith, with the post serving to support the respective steeling component on the frame.

31. The tool of claim 30, said respective post and said respective support member cooperatively defining a maximum post-support member cross-sectional dimension, said maximum post-support member cross-sectional dimension being less than about three times the maximum slot cross-sectional dimension.

* * * * *